July 21, 1964   J. DE JARNETTE BURKE, JR., ETAL   3,141,358
METHOD FOR FORMING SPINNING ORIFICES
IN SPINNERET PLATE STRUCTURES
Filed May 9, 1962                                2 Sheets-Sheet 1

INVENTOR
JAMES DE JARNETTE BURKE, JR
CURTIS OWEN HAWKINS
BY  Harry E. Braddock
ATTORNEY July 21, 1964   J. DE JARNETTE BURKE, JR., ETAL   3,141,358
METHOD FOR FORMING SPINNING ORIFICES
IN SPINNERET PLATE STRUCTURES
Filed May 9, 1962                                        2 Sheets-Sheet 2

INVENTOR
JAMES DE JARNETTE BURKE JR
CURTIS OWEN HAWKINS

BY  Harry C. Braddock
ATTORNEY

United States Patent Office 3,141,358
Patented July 21, 1964

3,141,358
METHOD FOR FORMING SPINNING ORIFICES
IN SPINNERET PLATE STRUCTURES
James De Jarnette Burke, Jr., Kinston, and Curtis Owen
Hawkins, Cove City, N.C., assignors to E. I. du Pont de
Nemours and Company, Wilmington, Del., a corporation of Delaware
Filed May 9, 1962, Ser. No. 193,418
9 Claims. (Cl. 76—107)

This invention relates generally to apparatus for extrusion of viscous organic materials and, more particularly, to the fabrication of spinneret plates adapted for use in the spinning of synthetic filaments.

In the preparation of spinneret plate capillary passageways, the procedure of punching a straight round hole through the remaining thickness of a blank remaining after the blank has been initially partially counterbored is known. The fabrication of passageways by drilling is also well-known. The straight-walled capillary portion of the passageway has been limited either to short length or to relatively large diameter by the physical characteristics of the punch, drill or other tools used to form the passageway. Straight-sided punches of sufficiently small transverse cross section, or fineness, to produce small holes are prone to breakage during the punching operation. Therefore, most punches are tapered toward the point in order to increase the punch rigidity and strength. It has been found that drills are even more fragile than punches, and therefore their use is usually economically limited to larger sized holes or spinneret plate passageways.

Of even greater concern than the economy and ease of manufacture of either punched or drilled holes made by methods known heretofore, is the inefficiency and difficulty encountered in the extrusion operation, using spinnerets fabricated according to the best previously known techniques. Because of the short length of capillary passageways or holes when made by methods of the prior art, insufficient molecular orientation is imparted to the filaments during spinning or extrusion of the filaments, causing their cross-sectional shapes to alter considerably from the designed shape of the hole and orifice. Particularly, in the spinning of hollow filaments, a short capillary section of the passageway or hole, reduces significantly the amount of structural support to the internal element or obstruction in the passageway which produces the hollow interior portion of the filament. In addition, failure to impart sufficient orientation to the filaments during spinning or extrusion causes many undesired opened or split filaments to be formed instead of the desired true hollow filaments.

An object of the present invention is to provide an improved method of fabricating spinneret plate passageways or holes having relatively long straight-walled portions adjacent the extrusion orifices of the passageways.

Another object of the invention is the provision of such an improved method for fabrication of straight-walled shaped holes utilizing tapered punches or tooling to initially form the passageway portion adjacent the extrusion orifice.

Another object of the invention is the provision of improved spinneret plate structures of improved structural properties and having passageways and extrusion orifices of great uniformity.

With these and other objects in view, the presently disclosed method of manufacturing a spinneret plate comprises generally the steps of forming a protuberance on the spinneret plate face, stamping into the protuberance from the face side with a shaped punch tapered in a direction of its advance to form a tapered hole and pressing the protuberance from the face side to displace the plate structure defining the protuberance and hole in an amount sufficient to constrict the orifice formed by the tapered hole in the face and angularly align the tapered side walls of the hole into desired parallel relationship to form a hole with substantially cylindrical side walls. In addition, the face of the spinneret may then be lapped, if desired.

Other objects and advantages will appear from a review of the specification and claims, taken with the accompanying drawings in which:

Figure 7:
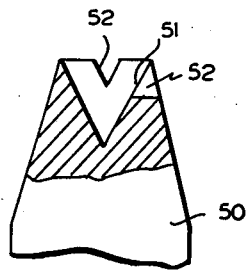
FIGURE 7 is an end view of a different punch element used to form the modified indentation of FIGURE 8.
Figure 8:
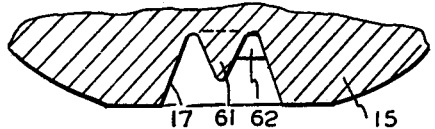
Figure 9:
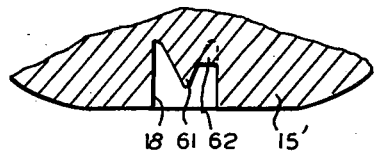
Figure 10:
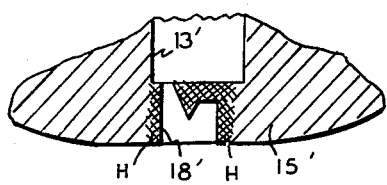
Figure 11:
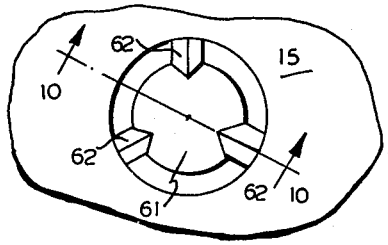

FIGURES 8, 9, and 10 illustrate the sequence of steps followed in forming a modified spinning orifice using the punch element of FIGURE 7.

Figure 1:
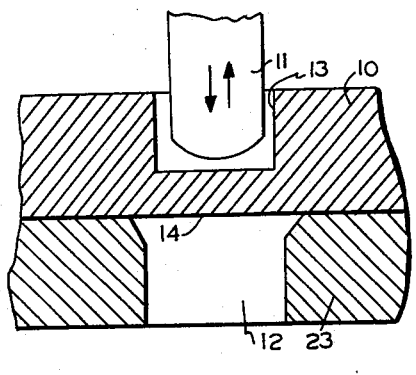
FIGURE 1 is a cross-sectional view of a portion of a spinneret plate blank, showing a ram or plunger in position to form a protuberance on the spinneret face supported by a die.
Figure 2:
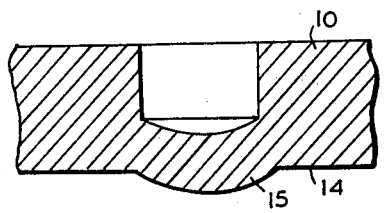
FIGURE 2 is a cross-section showing the protuberance formed on the face of the spinneret plate.
Figure 2A:
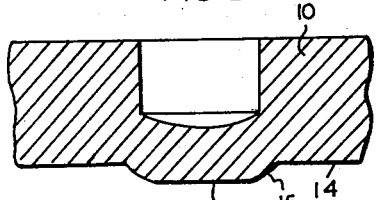
FIGURE 2a is a cross-section showing an optional formation of a flat surface on the protuberance of the spinneret plate face.

Referring now to FIGURE 1 the numeral 10 designates a spinneret plate blank containing a spinneret plate counterbore hole 13 aligned with a cavity 12 in a back-up die 23. The face 14 of the spinneret 10 is in contact with said die. In this position, pressure from a suitable conventional outside source (not illustrated) on the ram 11, in the downward direction as shown in FIGURE 1, will cause a protuberance 15 to be formed on the face 14 of the spinneret plate as illustrated in FIGURE 2. It is preferable, though not required, to lap slightly the face of the protuberance 15 to form a flat surface 16 therein which prevents deflection of the punch subsequently used in a following operation. The flattened protuberance 16 is illustrated in FIGURE 2a.

Figure 3:
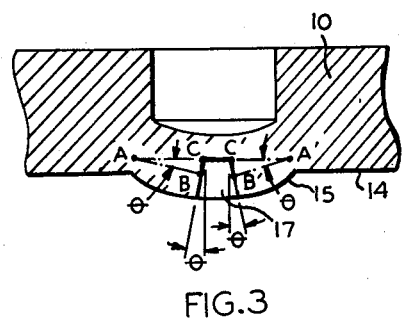
FIGURE 3 is a cross-section showing a hole or indentation with tapered walls as formed by a tapered punch.
Figure 4:
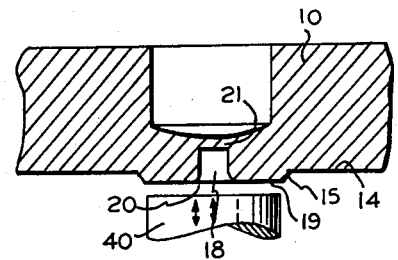
FIGURE 4 is a cross-section showing the resulting straight-walled hole formed by pressing the protuberance from the face side of the spinneret plate a sufficient amount.

Using a punch tapered in its direction of advance and shaped to form the desired outline of the hole, the spinneret is stamped from the face side 14 to form a hole or indentation 17 of the desired depth. FIGURE 3 illustrates the tapered hole 17. The protuberance 15 surrounding the tapered hole 17 is now pressed from the face side 14 of the spinneret forcing the metal surrounding hole 17 to reduce the size of the hole 17 until the walls of the hole have become nearly parallel, or substantially cylindrical in configuration, as illustrated by hole 18 in FIGURE 4. The flat surface 19 formed by pressing, the rounded edges of the hole 20, and as much of the remaining proturberance 15 as desired may be removed next by sanding, grinding, or polishing. The straight-sided hole 18 is now connected to the counterbore 13 by drilling through the counterbore to remove the intervening metal 21. This extension of the counterbore may be flat bottomed, or may be tapered as illustrated in FIGURE 5, numeral 22.

After inspection, the finished hole may be broached, lapped, or polished as necessary to remove burrs or scratches.

Figure 5:
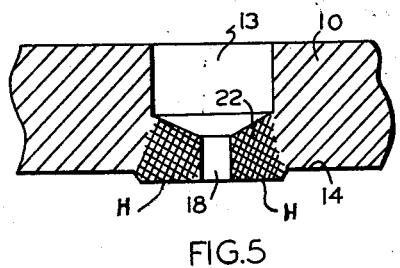
FIGURE 5 is a cross-section showing the completed hole or passageway in the spinneret plate structure.

The portions of metal defining the orifice and portion of the hole or passageway adjacent the face side of the spinneret plate indicated at H in FIGURES 5 and 10 will have enhanced properties of strength, rigidity, hardness, and resistance to erosion due to modifications brought about in its internal structure and grain size by the cold working or work hardening action of the process.

The tapered, wedge-shaped punch used to form the hole 17 should have an included angle between the sides of the punch that is between 20° and 40°. It has been found that with an angle of less than 20°, the punch breaks readily and, with an angle of over 40°, an undesirably large opening is formed. An angle of about 24° is preferred.

The invention is described in terms of a single hole or indentation and it is obvious that the production of the complete spinneret involves the repetition of the described method as many tmies as desired to produce the desired number of holes for a given spinneret design.

In one preferred arrangement embodying principle of this invention, a disk shaped spinneret blank 3.120 inches in diameter and 0.312 inches thick made of type 430 stainless steel was drilled from the back to form a counterbore hole 0.094 inch diameter extending to within 0.110 inch of the spinneret face. A blunt tipped ram 0.090 inch in diameter was positioned in said counterbore hole of the spinneret and aligned with a backup die containing a cavity 3/16 of an inch in diameter and 1/8 inch deep. The cavity of the die has a 1/32 inch 45° chamfer. A pressure of 2.75 tons was exerted on said ram to form a protuberance on the face of said spinneret approximately 0.250 inch in diameter and 0.010 inch in height. Said protuberance was lapped to remove about 0.002 to 0.003 inch from the crest to form a slight flat spot. Using a 24 degree tapered punch which is 0.025 inch in diameter at the tip, said protuberance was punched to form a tapered hole 0.015 inch deep. The face of the spinneret was pressed under two tons pressure, flattening the protuberance and causing the tapered sides of said hole to become substantially parallel. The face of said spinneret was then lapped to remove the rounded edges of the newly formed hole. The spinneret hole was completed by continuing the counterbore drilling of the first step to a depth sufficient to meet the straight-walled hole formed on the face of said spinneret. Obviously, broaching, polishing, or lapping may be performed as necessary according to methods well-known in the art.

In a modified arrangement, a spinneret hole was constructed according to the method described in the preceding paragraph to the point of the formation of the flattened protuberance. The hole was completed by using a tapered punch having a trilobal cross-section. Each lobe of the cross-section was rectangular shaped, 0.003 inch thick, and 0.007 inch long. The punch was stamped into the protuberance on the face of the spinneret and the hole was completed as in the remaining steps of the above procedure. Measurements made on the trilobal poriton of the completed hole indicated this portion of the hole was 0.012 inch in length and the thickness of the lobes was 0.003 inch throughout the length of this portion of the hole.

In order to demonstrate the problems and defects of the prior art arrangements, using a trilobal punch with lobes 0.003 inch by 0.007 inch, a hole was made in a spinneret blank using the conventional technique well-known to the prior art by punching through the counterbore and polishing the face of the spinneret to form an orifice. Such a procedure is described in Pamm et al., U.S. 2,816,349, column 4, beginning on line 72. The trilobal capillary portion of this hole, or passageway, was measured and found to be 0.012 inch in length having lobes tapering from 0.003 inch thick at the spinneret face to 0.006 inch thick at the counterbore end of the capillary portion of said hole, and was uniformly tapered throughout the length of the hole.

Spinning tests made with spinnerets of the preceding two arrangements indicated that improved filament denier uniformity was obtained with the substantially cylindrical or parallel-sided holes or passageways as compared with the filament denier uniformity used for the tapered passageways or holes.

Figure 6:
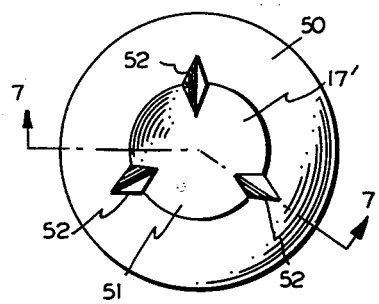
FIGURE 6 is an end view of a punch element used to form the modified indentations shown in FIGURE 11.

This invention was successfully applied to fabrication of one piece integral spinneret plates for spinning hollow filaments using the following approach. A spinneret blank 3.120 inches in diameter and .312 inch thick was prepared by counterboring and pressing to form a protuberance as indicated in the earlier-discussed preferred version of this invention. A 24° tapered punch, similar to punch 50 shown in FIGURES 6 and 7, without notches 52, which was 0.025 inch in diameter at the tip and contained a 0.017 inch diameter tapered hole in the tip, was stamped into the face side of the protuberance. The tapered annular indentation or hole formed by said stamping step was in the shape of a circular tapered groove 0.015 inch deep, 0.004 inch wide at the bottom of the annulus, and 0.007 inch wide at the top of the annulus. The metal of the protuberance around the annulus was pressed at two tons pressure from the face side, to straighten the outer sides of the annular indentation to a substantially cylindrical configuration. A counterbore from the other side of the spinneret plate was drilled until only 0.018 inch of metal remained between the counterbore and the face of the spinneret. Using a drilling jig, three holes were drilled in the bottom of the counterbore to connect the counterbore to the bottom of the annular indentation on the face side of the spinneret. These three holes were 0.015 inch in diameter and spaced 120° apart on the pitch diameter of the annular indentation and were drilled to within 0.005 inch of the spinneret face. The three holes connecting the annulus to the counterbore were broached to remove burrs and complete formation of the orifice for spinning hollow filaments.

Another application of the principles of this invention to produce an orifice for spinning hollow filaments is set forth as follows: A counterbore was drilled in the back of a spinneret plate. The counterbore was 0.094 inch in diameter and was drilled to within 0.110 inch of the spinneret face. A blunt ram, 0.090 inch in diameter, was passed through the counterbore using 2.75 tons pressure while the spinneret was supported by a backup die similar to those used previously. This operation formed a somewhat rounded protuberance on the face of the spinneret 0.250 inch in diameter and 0.007 inch in height from the face of the spinneret. About 0.002 to 0.003 inch was lapped from the protuberance to form a slight flat surface. A tapered punch, shown as 50 in FIGURES 6 and 7, 0.025 inch in diameter, having an angle of 24° between the sides of the punch, was prepared having a recessed tip. The sides of the recessed tip form an angle of 12°. The leading edge of the punch was notched at three places, 52, spaced 120° apart around the tip of the punch. The three notches 52 are 0.006 inch in width and 0.006 inch in depth. This punch was stamped into the protuberance on the face of the spinneret to form an annulus 17' 0.015 inch deep, 0.004 inch wide at the bottom of the annulus, and 0.007 inch wide at the top of the annulus and an inner element 61 forming the central portion of the annular indentation. The tapered annulus contained three webs 62 0.006 inch high and 0.006 inch wide, formed by the notches 52 in the tip of the punch. The protuberance on the face of the spinneret was pressed under two tons pressure until the outer walls 18' of the annulus were approximately parallel or cylindrical in configuration. The protuberance on the face of the spinneret was lapped to remove the rounded corners of the annulus at the face of the spinneret. The counterbore was extended to form a flat-bottomed counterbore leaving 0.015 inch of metal between the flat bottom of the counterbore and face of the spinneret. This operation connected the annulus in the face of the spinneret to the counterbore, except for the webs 62 interconnected between the central element 61 and the rest of the spinneret plate structure, which webs were formed by the notches 52 in the punch 50 used. The openings from the annulus to the counterbore were broached between the webs to remove burrs. The face of the spinneret could be given a final lap as necessary to remove scratches.

Conventional type spinnerets made by punching through the counterbore are generally limited to short capillaries. Likewise, spinnerets made by punching from both sides of the spinneret have either tapered capillaries or only short sections of straight sided holes. The spinning of some filaments through short capillary holes has been unsatisfactory, because of lack of structural support and insufficient spin orientation due to low jet velocity of the filament from the hole. Using the technique of this invention, it has been possible to produce improved spinneret plates with capillary holes of considerably increased length, as long as 0.020 inch or more using certain punches whose cross-sectional configuration contributes to the rigidity of the punch in the manner provided by this invention.

In addition to providing an arrangement for the formation of long straight sided holes, the technique and construction of this invention has permitted the fabrication of many intricate and useful configurations previously believed to be difficult, if not impossible to construct. The technique of this invention is not limited to regularly shaped or symmetrically shaped holes. In addition to the round, square, rectangular, trilobal, or hollow-shaped holes described in the examples or known in the prior art, other polygon or geometric shapes are conceivable which may be suitably formed in the tip of a tapered punch designed according to this invention. By hollow-shaped or annular orifices is meant orifices which are capable of spinning filaments which contain continuous voids throughout their length. Such hollow shapes require a shaped obstruction supported within the confines of the periphery of a shaped hole by a supporting web or similarly functioning mechanical connection.

The improved spinneret members or plates made by the process of the present invention may be of any conventional material employed in spinneret construction. Metallic construction such as those of the stainless steels are especially suitable. The spinneret plates made by the process disclosed are simple in construction, economical to fabricate, and effective in operation. Indeed their performance has been observed to be superior and improved with respect to prior art spinneret plates. The novel spinneret structures of this invention are improved over the prior art structures and are distinguished by their simple unitary construction even in the form suitable for spinning hollow filaments, and by the elongated cylindrical capillary portions of the passageway adjacent the orifice which give greater filament denier uniformity, and also by the work hardened structure which defines the capillary portion of the passageway and its orifice in order to give significantly increased rigidity, strength, hardness, and resistance to erosion. It is believed clearly within the spirit of the invention and the scope of the appended claims to form the tapered indentation in the spinning face side of a spinneret plate member and deflect the indented portion inwardly from the face side to cause the sidewalls of the indentation to become cylindrical, without first forming the protuberance in the face side of the plate member. Under these conditions a reverse protuberance would be formed. This version of the process would of course be used under conditions in which the reverse protuberances could be tolerated.

Although a limited number of preferred embodiments of this invention have been disclosed, other modifications within the spirit of this invention will occur to those skilled in the art. All such modifications are considered to fall within the scope of the following claims.

We claim:

1. An improved method of forming a spinning orifice and an elongated passageway with substantially parallel side wall elements in a spinneret plate structure, said plate structure provided with one side having a spinning face and an other side, said process comprising deflecting a portion of said plate structure in the direction of the plate face to form a smoothly contoured protuberance extending from the plate face, forming an indentation with inwardly tapered side walls in the central portion of the protuberance from the face of said plate structure, deflecting the central portion of said protuberance in the reverse direction toward the plane of the plate face a sufficient amount to cause the tapered side walls of the indentation to become substantially parallel, and removing a portion of the plate structure adjacent said indentation to connect said indentation with the other side of said plate structure.

2. The method of claim 1 in which the tapered side walls are formed to make a given angle with a line normal to the plate face and said deflection in the reverse direction causes an angular deflection of the plate structure forming said protuberance substantially equal to said given angle.

3. The method of claim 2 in which said given angle is from about 10° and 20°.

4. The method of claim 3 in which said angle is about 12°.

5. The method of claim 2 in which said indentation is formed in the configuration of at least a portion of a cone.

6. An improved method of forming a spinning orifice and an elongated passageway with substantially parallel side wall elements in a spinneret plate structure, said plate structure provided with one side having a spinning face and another side, said process comprising deflecting a portion of said plate structure in the direction of the plate face to form a smoothly contoured protuberance extending from the plate face, forming an indentation with inwardly tapered side walls in the central portion of the protuberance from the face of said plate structure, deflecting the central portion of said protuberance in the reverse direction toward the plane of the plate face a sufficient amount to cause the tapered side walls of the indentation to become substantially parallel, and removing a portion of the plate structure adjacent said indentation to connect said indentation with the other side of said plate structure, said tapered side walls formed to make a given angle with a line normal to the plate face and said deflection in the reverse direction causes an angular deflection of the plate structure forming said protuberance substantially equal to said given angle, said indentation formed in an annular configuration.

7. The method of claim 6 in which circumferentially spaced portions of said plate structure around said annular indentation are removed to connect the indentation with said other side of said plate structure and form an orifice and passageway for the extrusion of hollow filaments.

8. An improved method for forming a spinning orifice and an elongated passageway with substantially parallel side wall elements in a spinneret plate member, said plate member having one side provided with a spinning face and another side, said process comprising forming in said plate member from the spinning face side an indentation with inwardly tapered side walls, deflecting inwardly, from the face side, the portion of the member surrounding the indentation an amount sufficient to cause the tapered side walls of the indentation to become substantially cylindrical in configuration and removing a portion of the plate member adjacent the indentation to form a passageway connecting the indentation with the other side of said plate member.

9. The method of claim 8 which further comprises finishing the face of the member and the interior of said indentation and passageway to produce a sharply defined orifice and remove any burrs therefrom.

References Cited in the file of this patent

UNITED STATES PATENTS

| | | |
|---|---|---|
| 2,618,989 | Cupler | Nov. 25, 1952 |
| 2,737,831 | Webb | Mar. 13, 1956 |
| 2,879,676 | Burkhardt et al. | Mar. 31, 1959 |
| 2,985,911 | Griset | May 30, 1961 |
| 3,006,026 | Martin et al. | Oct. 31, 1961 |
| 3,017,789 | Cobb | Jan. 23, 1962 |